US012096049B2

(12) United States Patent
Fahnestock et al.

(10) Patent No.: US 12,096,049 B2
(45) Date of Patent: Sep. 17, 2024

(54) METHODS AND APPARATUS FOR IDENTIFICATION OF LOCAL COMMERCIAL INSERTION OPPORTUNITIES

(71) Applicant: The Nielsen Company (US), LLC, New York, NY (US)

(72) Inventors: Justin Fahnestock, Tampa, FL (US); Ronan Heffernan, Wesley Chapel, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/336,470

(22) Filed: Jun. 16, 2023

(65) Prior Publication Data
US 2023/0412856 A1 Dec. 21, 2023

Related U.S. Application Data

(63) Continuation of application No. 17/516,356, filed on Nov. 1, 2021, now Pat. No. 11,722,709, which is a
(Continued)

(51) Int. Cl.
*H04N 21/23* (2011.01)
*G10L 19/018* (2013.01)
(Continued)

(52) U.S. Cl.
CPC ..... *H04N 21/23424* (2013.01); *G10L 19/018* (2013.01); *H04N 21/2407* (2013.01); *H04N 21/8358* (2013.01); *H04N 21/4394* (2013.01)

(58) Field of Classification Search
None
See application file for complete search history.

(56) References Cited

U.S. PATENT DOCUMENTS

| 4,115,824 | A | 9/1978 | Mindell |
| 5,481,294 | A | 1/1996 | Thomas et al. |

(Continued)

FOREIGN PATENT DOCUMENTS

| CN | 101946486 | 1/2011 |
| CN | 102217319 | 10/2011 |

(Continued)

OTHER PUBLICATIONS

Kandhan et al., "SigMatch: Fast and Scalable Multi-Pattern Matching," Proceedings of the VLDB Endowment, vol. 3, No. 1, 2010, 12 pages.

(Continued)

*Primary Examiner* — Cai Y Chen

(57) ABSTRACT

Methods, apparatus, systems and articles of manufacture are disclosed for identification of local commercial insertion opportunities. Example apparatus for identification of local commercial insertion opportunities include a media comparator to compare respective instances of media conveyed in respective ones of a plurality of broadcast signals associated with affiliates of a national broadcaster to identify a broadcast interval having different media conveyed among at least some of the broadcast signals. The example apparatus also include an insertion opportunity identifier to determine whether the broadcast interval is associated with a local advertisement insertion opportunity based on a characteristic of the broadcast interval.

20 Claims, 7 Drawing Sheets

Related U.S. Application Data continuation of application No. 15/947,569, filed on Apr. 6, 2018, now Pat. No. 11,166,054.

(51) Int. Cl.
*H04N 21/234* (2011.01)
*H04N 21/24* (2011.01)
*H04N 21/8358* (2011.01)
*H04N 21/439* (2011.01)

(56) References Cited

U.S. PATENT DOCUMENTS

| | | |
|---|---|---|
| 7,930,714 B2 | 4/2011 | König et al. |
| 7,986,913 B2 | 7/2011 | Wang |
| 8,189,231 B1 | 5/2012 | Taylor et al. |
| 8,302,122 B1 | 10/2012 | Hecht et al. |
| 8,990,951 B1 | 3/2015 | Krüger et al. |
| 9,055,239 B2 | 6/2015 | Tehranchi et al. |
| 9,071,371 B2 | 6/2015 | Wang |
| 9,225,444 B2 | 12/2015 | Wang |
| 9,258,604 B1 | 2/2016 | Bilobrov et al. |
| 9,510,044 B1 | 11/2016 | Pereira et al. |
| 9,544,622 B2 | 1/2017 | Ramaswamy et al. |
| 9,591,353 B2 | 3/2017 | Wright et al. |
| 11,082,730 B2 | 8/2021 | Davis et al. |
| 11,166,054 B2 | 11/2021 | Fahnestock et al. |
| 11,722,706 B2 | 8/2023 | Fahnestock et al. |
| 2001/0055463 A1 | 12/2001 | Armengaud |
| 2003/0070167 A1 | 4/2003 | Holtz et al. |
| 2004/0062520 A1 | 4/2004 | Gutta et al. |
| 2006/0195859 A1 | 8/2006 | Konig et al. |
| 2006/0195861 A1 | 8/2006 | Lee |
| 2007/0016918 A1 | 1/2007 | Alcorn et al. |
| 2007/0039018 A1 | 2/2007 | Saslow et al. |
| 2007/0107022 A1 | 5/2007 | Lawrence, III |
| 2007/0143777 A1 | 6/2007 | Wang |
| 2007/0162927 A1 | 7/2007 | Ramaswamy et al. |
| 2007/0250856 A1 | 10/2007 | Leavens et al. |
| 2009/0094631 A1 | 4/2009 | Whymark et al. |
| 2009/0132339 A1 | 5/2009 | Sloo et al. |
| 2009/0259325 A1 | 10/2009 | Topchy et al. |
| 2009/0320063 A1 | 12/2009 | Barrett |
| 2010/0302452 A1 | 12/2010 | Langelaar |
| 2011/0128445 A1 | 6/2011 | Carrières |
| 2011/0157475 A1 | 6/2011 | Wright et al. |
| 2011/0252442 A1 | 10/2011 | Cui et al. |
| 2011/0264455 A1 | 10/2011 | Nelson et al. |
| 2011/0314495 A1 | 12/2011 | Zenor |
| 2012/0173342 A1 | 7/2012 | Rajaopadhye |
| 2013/0031582 A1* | 1/2013 | Tinsman ............ H04N 21/4316 725/36 |
| 2013/0276025 A1 | 10/2013 | Sherwin et al. |
| 2013/0298151 A1 | 11/2013 | Leske et al. |
| 2014/0013352 A1 | 1/2014 | Shavit et al. |
| 2014/0082648 A1 | 3/2014 | Tanner et al. |
| 2014/0101685 A1* | 4/2014 | Kitts .................... H04N 21/251 725/14 |
| 2014/0111698 A1 | 4/2014 | Jain et al. |
| 2014/0114455 A1 | 4/2014 | Larsen et al. |
| 2014/0282672 A1 | 9/2014 | McMillan |
| 2015/0058877 A1 | 2/2015 | Lakkundi et al. |
| 2015/0082332 A1 | 3/2015 | Wright et al. |
| 2015/0229421 A1 | 8/2015 | Anniballi et al. |
| 2015/0279381 A1 | 10/2015 | Goesnar et al. |
| 2016/0140969 A1 | 5/2016 | Srinivasan et al. |
| 2016/0150297 A1 | 5/2016 | Petrovic et al. |
| 2016/0180362 A1 | 6/2016 | Brown et al. |
| 2017/0048596 A1 | 2/2017 | Fonseca, Jr. et al. |
| 2017/0094359 A1 | 3/2017 | Basra |
| 2017/0155972 A1 | 6/2017 | Goli et al. |
| 2017/0155973 A1 | 6/2017 | Muller et al. |
| 2017/0264930 A1 | 9/2017 | Mitra et al. |
| 2017/0373774 A1* | 12/2017 | Loureda ............ H04N 21/6547 |
| 2018/0035174 A1 | 2/2018 | Littlejohn |
| 2018/0192119 A1 | 7/2018 | Stigall et al. |
| 2018/0373939 A1 | 12/2018 | Diggins |
| 2019/0313134 A1 | 10/2019 | Fahnestock et al. |
| 2021/0099738 A1 | 4/2021 | Davis et al. |
| 2021/0385534 A1 | 12/2021 | Baig et al. |
| 2022/0094997 A1 | 3/2022 | Davis et al. |
| 2022/0132185 A1 | 4/2022 | Fahnestock et al. |

FOREIGN PATENT DOCUMENTS

| | | |
|---|---|---|
| CN | 102291608 | 12/2011 |
| CN | 103069823 | 4/2013 |
| CN | 103180869 | 6/2013 |
| CN | 103686254 | 3/2014 |
| CN | 104429091 | 3/2015 |
| CN | 105900443 | 8/2016 |
| EP | 2408126 | 1/2012 |
| EP | 2722808 | 4/2014 |
| JP | 2008-009442 | 1/2008 |
| JP | 2009-505234 | 2/2009 |
| JP | 2021-519557 | 8/2021 |
| KR | 10-2015-0024306 | 3/2015 |
| WO | 2007/019572 | 2/2007 |
| WO | 2019/195431 | 10/2019 |
| WO | 2021/067289 | 4/2021 |

OTHER PUBLICATIONS

Wikipedia, "Local Insertion," Wikipedia, Oct. 3, 2017, [https://en.wikipedia.org/w/index.php?title=Local_insertion&oldid=803557941] 3 pages.

United States Patent and Trademark Office, "Non-Final Office Action," issued in connection with U.S. Appl. No. 15/947,569, filed Dec. 31, 2019, 16 pages.

United States Patent and Trademark Office, "Final Office Action," issued in connection with U.S. Appl. No. 15/947,569, filed Jul. 6, 2020, 16 pages.

United States Patent and Trademark Office, "Non-Final Office Action," issued in connection with U.S. Appl. No. 15/947,569, filed Jan. 6, 2021, 15 pages.

United States Patent and Trademark Office, "Notice of Allowance and Fee(s) Due," issued in connection with U.S. Appl. No. 15/947,569, filed Jun. 29, 2021, 13 pages.

International Searching Authority, "International Search Report," issued in connection with International Application No. PCT/US2019/025595, Jul. 12, 2019, 3 pages.

International Searching Authority, "Written Opinion," issued in connection with International Application No. PCT/US2019/025595, Jul. 12, 2019, 6 pages.

International Searching Authority, "International Preliminary Report on Patentability," issued in connection with International Application No. PCT/US2019/025595, Oct. 6, 2020, 7 pages.

United States Patent and Trademark Office, "Notice of Allowance and Fee(s) Due, " issued in connection with U.S. Appl. No. 16/588,970, filed Nov. 30, 2020, 8 pages.

United States Patent and Trademark Office, "Notice of Allowance and Fee(s) Due," issued in connection with U.S. Appl. No. 16/588,970, filed Mar. 24, 2021, 5 pages.

International Searching Authority, "International Search Report and Written Opinion," issued in connection with International Application No. PCT/US2020/053301, Jan. 20, 2021, 8 pages.

International Searching Authority, "International Preliminary Report on Patentability," issued in connection with International Application No. PCT/US2020/053301, Apr. 5, 2022, 6 pages.

United States Patent and Trademark Office, "Non-Final Office Action," issued in connection with U.S. Appl. No. 17/389,027, filed Sep. 20, 2022, 6 pages.

United States Patent and Trademark Office, "Notice of Allowance and Fee(s) Due," issued in connection with U.S. Appl. No. 17/389,027, filed Jan. 30, 2023, 5 pages.

The State Intellectual Property Office of People's Republic of China, "The First Office Action," issued in connection with Chinese Patent Application No. 201980035656.8, Dec. 28, 2021, 20 pages, with English translation.

(56) References Cited

OTHER PUBLICATIONS

The State Intellectual Property Office of People's Republic of China, "The Second Office Action," issued in connection with Chinese Patent Application No. 201980035656.8, Aug. 3, 2022, 8 pages, with English translation.

The State Intellectual Property Office of People's Republic of China, "Notice of Decision of Granting Patent Right for Invention," issued in connection with Chinese Patent Application No. 201980035656.8, Dec. 23, 2022, 5 pages, with English translation.

European Patent Office, "Extended European Search Report," issued in connection with European Application No. 19781249.8, Dec. 14, 2021, 9 pages.

Japanese Patent Office, "Decision to Grant a Patent," issued in connection with Japanese Patent Application No. 2020-554249, Dec. 14, 2021, 5 pages, with English translation.

Korean Intellectual Property Office, "Request for the Submission of an Opinion," issued in connection with Korean Patent Application No. 10-2020-7030809, Jan. 19, 2022, 9 pages, with English translation.

Korean Intellectual Property Office, "Patent Decision Document," issued in connection with Korean Patent Application No. 10-2020-7030809, Jun. 7, 2022, 4 pages, with English translation.

United States Patent and Trademark Office, "Notice of Allowability," issued in connection with U.S. Appl. No. 15/947,569, filed Jul. 12, 2021, 3 pages.

Japanese Patent Office, "Notice of Reasons for Rejection," issued in connection with Japanese Patent Application No. 2021-210955, Mar. 7, 2023, 4 pages, with English translation.

United States Patent and Trademark Office, "Notice of Allowance and Fee(s) Due," issued in connection with U.S. Appl. No. 17/516,356, filed Mar. 16, 2023, 7 pages.

Japanese Patent Office, "Decision to Grant a Patent," issued in connection with Japanese Patent Application No. 2021-210955, Jul. 11, 2023, 5 pages, with English translation.

United States Patent and Trademark Office, "Non-Final Rejection," in connection with U.S. Appl. No. 18/321,600, mailed on Feb. 12, 2024, 5 pages.

\* cited by examiner

METHODS AND APPARATUS FOR IDENTIFICATION OF LOCAL COMMERCIAL INSERTION OPPORTUNITIES

RELATED APPLICATION

This patent arises from a continuation of U.S. patent application Ser. No. 17/516,356 (now U.S. Patent No. 11,722,709), which was filed on Nov. 1, 2021, and is a continuation of U.S. patent application Ser. No. 15/947,569 (now U.S. Pat. No. 11,166,054), which was filed on Apr. 6, 2018. U.S. patent application Ser. No. 17/516,356 and U.S. patent application Ser. No. 15/947,569 are hereby incorporated herein by reference in their entireties. Priority to U.S. patent application Ser. No. 17/516,356 and U.S. patent application Ser. No. 15/947,569 is hereby claimed.

FIELD OF THE DISCLOSURE

This disclosure relates generally to media monitoring, and, more particularly, to methods and apparatus for identification of local commercial insertion opportunities.

BACKGROUND

For years, national broadcasters have allocated time for local commercials to be inserted into programming on affiliate stations displaying national broadcasts. Some local affiliate broadcasters utilize such local insertion opportunities to display local advertisements, while others display national advertisements, or display alternative programming. National broadcasters can alert affiliate stations to such commercial insertion opportunities and the local affiliate stations can select a course of action. Such advertisement insertion opportunities have been identified by national broadcasters to local affiliate stations using a number of methods, including cue tones, white space in the broadcast signal, SCTE-35 codes, direct-contact from the broadcast, and/or a variety of other indication methods.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
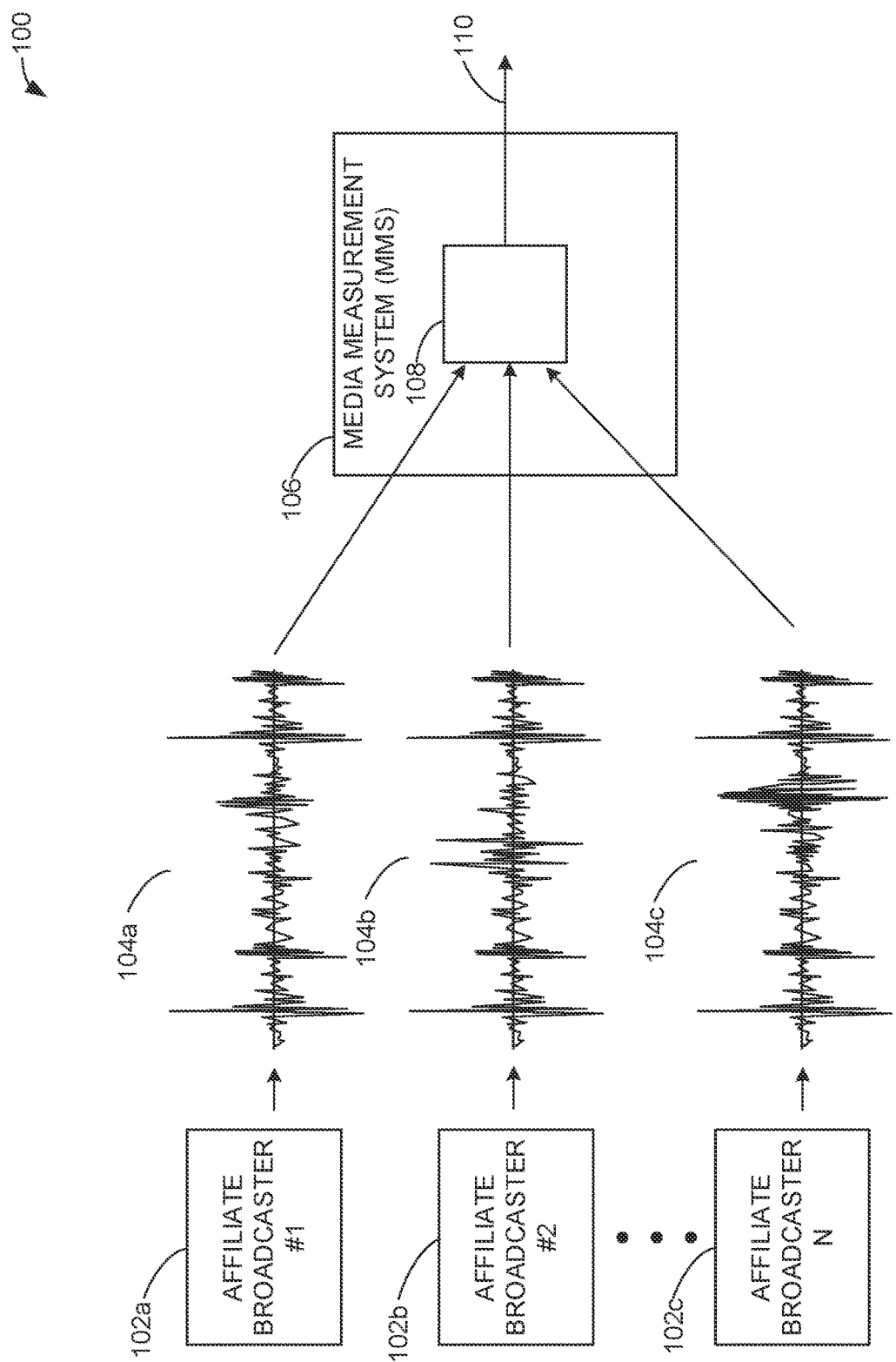
FIG. 1 is a schematic illustration of an example system constructed to identify local commercial insertion opportunities in accordance with teachings of this disclosure.

National broadcasts are often distributed by a national broadcaster to multiple local affiliate stations (e.g., stations within the same network, etc.) for display. For example, a local affiliate station (e.g., a station that directly broadcasts to a specific area, group of subscribers, etc.) may display nationally distributed broadcasts in addition to, or alternatively to, local broadcasts. Affiliate stations that display national broadcasts are given the opportunity to insert their own content, such as local advertisements, at specific times throughout the national broadcast. An example national broadcast may include, for example, a two-minute local (e.g., associated with a region, area, locality, etc.) commercial insertion opportunity. During a local commercial insertion opportunity (also referred to herein as a local insertion opportunity), a local affiliate station may continue to broadcast the national broadcast. In such an example, the national broadcast may include national advertisements (e.g., commercials, etc.) produced by the national broadcaster as an option for the local affiliates to broadcast during the local commercial insertion opportunity. In some examples, the local affiliate station may broadcast local advertisements (e.g., advertisements relevant to local businesses, relevant to local current affairs, relevant to sponsors or affiliates of the local affiliate station, etc.) during the local commercial insertion opportunity. In some examples, local affiliate stations may interrupt broadcasts in order to present alternative programming (e.g., a local news alert, an emergency alert, a long-form infomercial, etc.). In some such examples, the local affiliate stations may begin such alternative programming at any point in the national broadcast, including at a local insertion opportunity. As used herein, the term "broadcast" refers to any signal conveying media.

Local affiliate stations generally receive an identification of when a local commercial insertion opportunity exists from the national broadcaster, which enables the local affiliate station to display a local advertisement or alternative programming at the appropriate time. In some examples, the identification may be in the form of cue tones, which are signals inserted into the broadcast that are identifiable by local affiliates. A cue tone may be, for example, a dual-tone multi-frequency (DTMF) tone. In some examples, an audience measurement entity (e.g., The Nielsen Company (US), LLC) can identify and detect the cue tones in signals to identify local commercial insertion opportunities. In some examples, the identification may be in the form of Society of Cable Telecommunication Engineers-Standard 35 (SCTE-35) codes. SCTE-35 codes are a digital form of indicator similar to cue tones which are carried in the broadcasting stream, and can be used to indicate local insertion opportunities Similar to cue tones, an audience measurement entity (AME), also referred to as a media measurement entity, can identify and detect SCTE-35 codes in broadcast signals to identify local commercial insertion opportunities.

In some examples, a national broadcaster may utilize another method, which is difficult or impossible for an AME to detect, to indicate to local affiliate stations that a commercial insertion opportunity exists. For example, a national broadcast may transmit a signal included in the national broadcast signal in white space (e.g., unused frequencies, etc.) of the national broadcast signal. In such an example, an AME may have difficulty detecting, or may not be able to detect, the identification of the local insertion opportunity, as the AME may not be informed as to the specific white space utilized to indicate the local insertion opportunity, and/or may not be able to detect the white space signal. In some examples, national broadcasters may communicate with local affiliates via an inaccessible method, such as directly contacting the affiliate stations via email. In such an example, an AME may not have access to such emails or other direct contact communications.

Indications of local commercial insertion opportunities may include information such as specific times for local insertion opportunities (e.g., a start time, an end time). For example, a national broadcast may include a two minute commercial pod (e.g., a stop set, commercial break, etc.), in which the last thirty second spot is available for a local insertion. In such an example, the national broadcaster may provide, in advance and/or in real-time, an indication of the local insertion opportunity to the local affiliate station.

Conventionally, an entity (e.g., an AME) interested in tracking local commercial insertion opportunities may tune into broadcast signals and attempt to detect and identify indications of such opportunities (e.g., cue tones, SCTE-35 codes, etc.). However, with numerous types of indications being developed and utilized, such an approach may vary depending on the specific affiliate station. In some examples, the indication of a local insertion opportunity may be provided through private communications between the national broadcaster and the affiliate station. As a result, it is traditionally difficult, if not impossible for an AME, to track all local commercial insertion opportunities across a range of affiliate stations. Such local commercial insertion opportunity data may be desired for verification of local commercial presentations by advertisers, competitor local commercial analysis by advertisers, and/or any research entities to add another layer of granularity to media monitoring data, etc.

In example methods, systems, and articles of manufacture disclosed herein, broadcast signals are compared between local affiliate stations broadcasting the same national broadcast (e.g., in the same network) to identify local commercial insertion opportunities. In some examples, signatures, audio watermarks/codes, and/or some other identifiers based on the broadcast signals are utilized to compare the affiliate broadcast signals. In some examples, signatures, watermarks/codes, and/or some other identifies are included in video associated with the broadcast signals.

In some examples, watermarking may be utilized for comparison of the affiliate broadcast signals. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header).

As used herein "media" refers to audio and/or visual (still or moving) content and/or advertisements. For example, as used herein, the term "media" includes any type of content and/or advertisement delivered via any type of distribution medium. Thus, media includes television programming or advertisements, radio programming or advertisements, movies, web sites, streaming media, etc.

In some examples, to identify watermarked media, the watermark(s) are extracted and used to access a table of reference watermarks that are mapped to media identifying information. In some examples, signatures may be utilized for comparison of the affiliate broadcast signals. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is approximately repeatable when processing the same media presentation, but has at least some unique characteristics relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some example methods, systems, and articles of manufacture disclosed herein, characteristics of the local affiliate broadcast signals, such as a number of the broadcast signals conveying different media (e.g., different programming, commercials, etc.) and durations of the differences in broadcast signals (e.g., a duration associated with how long one local affiliate broadcast signal is different from other signals), are used to identify local commercial insertion opportunities.

In examples disclosed herein, local commercial insertion opportunities are identified in audio and/or audiovisual signals based on differences between the broadcast signals.

In some examples, the broadcast signals are accessed and/or acquired as they are presented, and are stored for later analysis. In some examples, the analysis may occur in real-time as the broadcast signals are presented, using continuous analysis and comparison of the broadcast signals. In some examples, the local commercial insertion opportunities are identified even if they are not utilized by many of the affiliate stations. For example, a national broadcaster may provide the opportunity for a local commercial insertion opportunity and only some of the affiliates may actually present local commercials during this time period. In such an example, the techniques disclosed herein may still identify the local commercial insertion opportunity, even if the affiliate station did not utilize the opportunity.

In contrast with conventional approaches for addressing media identification, example methods, systems and articles of manufacture disclosed herein enable a comprehensive approach for identifying local commercial insertion opportunities that is not dependent on the national broadcaster communicating a detectable indicator (e.g., a cue tone) along with the signal to the affiliate stations and/or knowledge of a private communication (e.g., a direct email to an affiliate) to the entity performing local insertion opportunity identification. Example techniques disclosed herein identify local insertion opportunities by comparing identifiers (e.g., signatures, watermarks/codes, etc.) associated with local affiliate broadcast signals to detect differences in the media presented by the different broadcast signals, and subsequently to analyze the differences to determine whether they are due to a local commercial insertion opportunity. Example techniques disclosed herein can utilize any form of comparison of broadcast signals and are not limited to watermarks/codes, signatures, and/or any other comparison approach.

While the techniques disclosed herein are, in some examples, described in the context of television and/or radio broadcasts, the techniques may be applied in a variety of applications, settings, or example implementations. Specifically, the techniques may be implemented in any broadcast processing application to identify differences in broadcast signals representative of insertion opportunities.

FIG. 1 is a schematic illustration of an example system 100 constructed to identify local commercial insertion opportunities in accordance with the teachings of this disclosure. The example system 100 includes example affiliate broadcasters 102a, 102b, and 102c broadcasting example affiliate broadcast signals 104a, 104b, and 104c which are monitored by an example media monitor system (MMS) 106 including an example insertion opportunity analyzer 108 to determine example local insertion opportunity data 110.

The affiliate broadcasters 102a, 102b, 102c, of the illustrated example of FIG. 1 are stations that broadcast the example affiliate broadcast signals 104a, 104b, 104c. At some times, the example affiliate broadcasters 102a, 102b, 102c can broadcast the same media (e.g., corresponding to national programming, commercials, etc.) and at other times can broadcast media that is not the same between the example affiliate broadcasters 102a, 102b, 102c. For example, the affiliate broadcasters 102a, 102b, 102c can broadcast respective broadcast signals 104a, 104b, 104c including a national broadcast distributed by a network (e.g., American Broadcasting Company (ABC), British Broadcasting Company (BBC), National Broadcasting Company (NBC), Fox Broadcasting Company (Fox), etc.). In some examples, the affiliate broadcasters 102a, 102b, 102c can be associated with a specific region (e.g., the midwestern United States, the East Coast of the United States, a specific city, a specific state, etc.). In some examples, the affiliate broadcasters 102a, 102b, 102c utilize local commercial insertion opportunities to broadcast local media, such as local commercials to a local/regional audience. Any number of affiliate broadcasters may exist in association with any given network. In some examples, one or more of the example affiliate broadcasters 102a, 102b, 102c are not associated with the same network. In such an example, the one or more of the example affiliate broadcasters 102a, 102b, 102c can contractually broadcast specific programming (e.g., one show, one special feature, one episode, etc.) from a network (e.g., a national broadcaster, etc.).

The affiliate broadcast signals 104a, 104b, 104c of the illustrated example of FIG. 1 are broadcast signals conveying media and are transmitted for presentation to respective audiences of the example affiliate broadcasters 102a, 102b, 102c. At some times, the example broadcast signals 104a, 104b, 104c are associated with matching intervals during which the broadcast signals 104a, 104b, 104c are substantially similar. In such intervals, the example broadcast signals likely convey national media from a network. At other times, the example broadcast signals 104a, 104b, 104c are associated with non-matching intervals during which one or more of the broadcast signals 104a, 104b, 104c convey substantially different media. In such non-matching intervals, the example broadcast signals 104a, 104b, 104c can include local advertisements, regional-specific programming (e.g., local news), and/or any other media. In some examples, the broadcast signals 104a, 104b, 104c are transmitted to specific regions associated with the example affiliate broadcasters 102a, 102b, 102c. In some examples, such regions may be overlapping, resulting in a plurality of the example affiliate broadcast signals 104a, 104b, 104c being available at the same location. In some examples, the broadcast signals 104a, 104b, 104c can include substantially more matching intervals during certain time periods of the day (e.g., the evening) when the example broadcast signal is broadcasting media from a network. In some such examples, the broadcast signals 104a, 104b, 104c can broadcast regional media during other time periods of the day (e.g., overnight), resulting in non-matching intervals with long durations. In some examples, one or more of the affiliate broadcast signals 104a, 104b, 104c can be a national broadcast, instead of an affiliate broadcast.

The MMS 106 of the illustrated example of FIG. 1 is structured to receive the example broadcast signals 104a, 104b, 104c and to monitor the signals to perform identification of local commercial insertion opportunities. For example, the MMS 106 can be localized to receive some or all of the broadcast signals 104a, 104b, 104c directly, and/or may receive the one or more of the broadcast signals 104a, 104b, 104c indirectly via intermediate receiving stations. In some examples, the MMS 106 is a server that collects and processes media monitoring information to generate metrics related to presented media. The example MMS 106 can, for example, analyze broadcast signals to analyze advertising effectiveness. The example MMS 106 can generate such data that may be advantageous to advertisers in determining the reach of existing advertisements, in making decisions on new advertisement opportunities, in analyzing competitor advertisements, etc. In some examples, the MMS 106 is associated with an AME (e.g., The Nielsen Company (US), LLC). In the illustrated example, the MMS 106 includes an example insertion opportunity analyzer 108.

The insertion opportunity analyzer 108 of the illustrated example of FIG. 1 analyzes the example affiliate broadcast signals 104a, 104b, 104c to identify the presence of local commercial insertion opportunities. The example insertion opportunity analyzer 108 receives and compares the example affiliate broadcast signals 104a, 104b, 104c to determine non-matching intervals associated with the affiliate broadcast signals 104a, 104b, 104c. The example insertion opportunity analyzer 108 determines whether non-matching intervals of the affiliate broadcast signals 104a, 104b, 104c represent local commercial insertion opportunities based on characteristics of the non-matching intervals. In some examples, the analyzed characteristics include durations of the non-matching intervals. In some examples, the analyzed characteristics of the non-matching intervals include a number of differences between the example affiliate broadcast signals 104a, 104b, 104c during the non-matching intervals.

In some examples, the insertion opportunity analyzer 108 detects and utilizes watermarks for comparison of media included in the example affiliate broadcast signals 104a, 104b, 104c. Additionally or alternatively, in some examples, the insertion opportunity analyzer 108 generates signatures at times throughout the example affiliate broadcast signals 104a, 104b, 104c to utilize for comparison of the affiliate broadcast signals 104a, 104b, 104c. Additionally or alternatively, in some examples, the insertion opportunity analyzer 108 detects identifiers (e.g., cue tones, SCTE-35 codes, etc.) embedded in or otherwise transmitted with broadcast signals. The example insertion opportunity analyzer 108 generates example local insertion opportunity data 110 including information identifying local commercial insertion opportunities.

The local insertion opportunity data 110 of the illustrated example of FIG. 1 is data pertaining to identified local commercial insertion opportunities. In some examples, the MMS 106 transmits the example local insertion opportunity data 110 to advertisers, broadcasters, and/or an entity requesting media analytics data. In some examples, the local insertion opportunity data 110 includes times (e.g., start time, duration, etc.) associated with local insertion opportunities. In some examples, the local insertion opportunity data 110 includes measures of confidence and/or additional granularity with respect to the identified local insertion opportunities. For example, the local insertion opportunity data 110 can include a number of differences identified during an identified local insertion opportunity, a measure of uniformity with respect to the duration of the local insertion opportunity between the example affiliate broadcast signals 104a, 104b, 104c, and/or any other data pertaining to the local commercial insertion opportunities. In some examples, the local insertion opportunity data may be included in a larger data set and/or report. For example, the larger data set may include specific identification (e.g., using watermarks, using signatures, etc.) of media that is presented in the example affiliate broadcast signals 104a, 104b, 104c. In such an example, the local insertion opportunity data 110 may be utilized to indicate that a local insertion opportunity exists at a given time where a difference in media has been identified, as opposed to the difference being attributed to a change in programming, a glitch at one or more of the affiliate broadcasters 102a, 104b, 104c, or any other cause of a difference between the example affiliate broadcast signals 104a, 104b, 104c.

In operation, the example affiliate broadcasters 102a, 102b, 102c transmit the example affiliate broadcast signals 104a, 104b, 104c including media. The example MMS 106 receives the example affiliate broadcast signals 104a, 104b, 104c for processing by the example insertion opportunity analyzer 108. The example insertion opportunity analyzer 108 compares the signals and performs processing to identify local commercial insertion opportunities included in the example affiliate broadcast signals 104a, 104b, 104c. The example insertion opportunity analyzer 108 then generates and outputs the example local insertion opportunity data 110.

Figure 2:
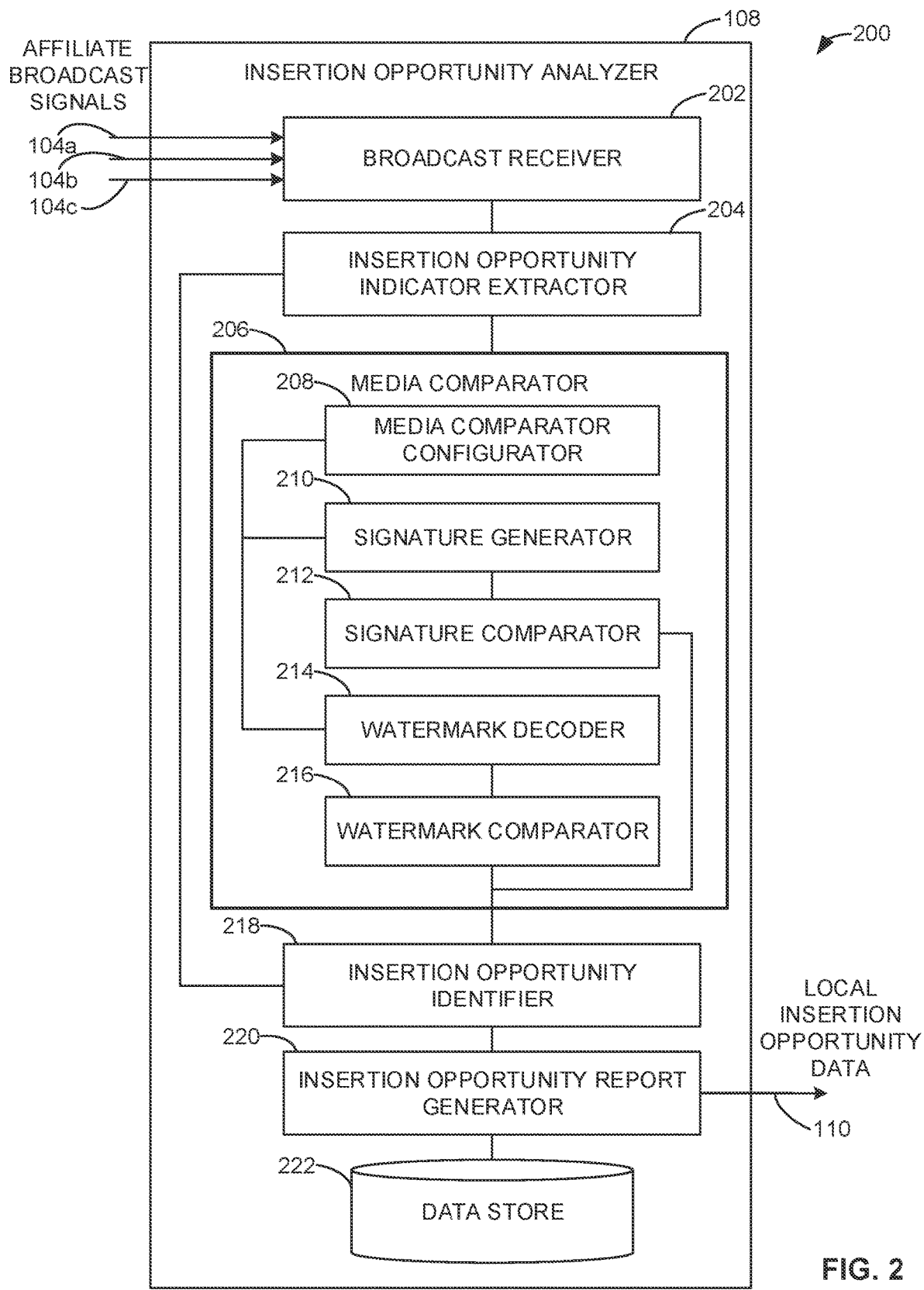
FIG. 2 is a schematic illustration of the example insertion opportunity analyzer of FIG. 1.

FIG. 2 is a schematic illustration of an example implementation of the insertion opportunity analyzer 108 of FIG. 1. The example insertion opportunity analyzer 108 of FIG. 2 includes an example broadcast receiver 202, an example insertion opportunity indicator extractor 204, and an example media comparator 206 including an example media comparator configurator 208, an example signature generator 210, an example signature comparator 212, an example watermark decoder 214, and an example watermark comparator 216. The example insertion opportunity analyzer 108 additionally includes an example insertion opportunity identifier 218, an example insertion opportunity report generator 220, and an example data store 222.

The broadcast receiver 202 of the illustrated example of FIG. 2 receives affiliate broadcast signals. The example broadcast receiver 202 can include any technology for receiving broadcast signals (e.g., one or more antennas, cable connections, streaming media receivers, etc.). The example broadcast receiver 202 can route broadcast signals to the example insertion opportunity indicator extractor 204 and/or to the example media comparator 206. In some examples, the broadcast receiver 202 is a plurality of broadcast receivers to receive the example affiliate broadcast signals 104a, 104b, 104c. For example, the broadcast receiver 202 can include one or more receivers placed in regions where the affiliate broadcast signals 104a, 104b, 104c, can be received. In some examples, the broadcast receiver 202 receives signatures associated with the affiliate broadcast signals 104a, 104b, 104c that have been received at receivers in geographic locations associated with the affiliate broadcast signals 104a, 104b, 104c. In some examples, the broadcast receiver 202 receives such signatures instead of the affiliate broadcast signals 104a, 104b, 104c. Similarly, the example broadcast receiver 202 can receive decoded watermarks associated with the affiliate broadcast signals 104a, 104b, 104c that have been detected and/or decoded at receivers in geographic locations associated with the affiliate broadcast signals 104a, 104b, 104c. In some examples, the broadcast receiver 202 is a central broadcast receiver, in communication with a plurality of broadcast receivers to receive the affiliate broadcast signal 104a, 104b, 104c. In some examples, the broadcast receiver 202 is external to the example insertion opportunity analyzer 108. In some such examples, the broadcast receiver 202 can route the affiliate broadcast signals 104a, 104b, 104c to the example insertion opportunity analyzer 108. In some examples, the broadcast receiver 202 receives a multitude of broadcast signals, and utilizes data associated with the broadcast signals to determine the affiliate broadcast signals 104a, 104b, 104c (e.g., the broadcast signals associated with the same network, playing the same national programming, etc.).

The insertion opportunity indicator extractor 204 of the illustrated example of FIG. 2 identifies the presence of local insertion opportunity indicators in broadcast signals. In some examples, the insertion opportunity indicator extractor 204 receives a broadcast signal from the broadcast receiver 202 that corresponds to a national broadcast and includes local insertion opportunity indicators. The example insertion opportunity indicator extractor 204 determines if any of the received broadcast signals include local insertion opportunity indicators. The example insertion opportunity indicator extractor 204 extracts any local insertion opportunity indicators (e.g., SCTE-35 codes, cue tones, etc.) from the broadcast signals. In some examples, the insertion opportunity indicator extractor 204 generates data indicating times and durations of local insertion opportunities for the broadcast signals based on the local insertion opportunity indicators. In some such examples, the insertion opportunity indicator extractor 204 can transmit such data to the example insertion opportunity identifier 218, to be combined with data from the example media comparator 206 for the determination of local insertion opportunities. In some examples, the insertion opportunity indicator extractor 204 communicates the broadcast signals to the example media comparator 206 after processing the broadcast signals. In some examples, when a signal is identified as including local insertion opportunity indicators, and the local insertion opportunity indicators are can be utilized to determine the local insertion opportunities for the broadcast signal(s), the insertion opportunity indicator extractor 204 can exclude the broadcast signal for which the local insertion opportunities have been identified from processing by the example media comparator 206. In some examples, such broadcast signals where local insertion opportunities have been identified based on indicators are utilized in conjunction with determinations by the media comparator 206 to verify the presence of local insertion opportunities and/or to extrapolate identified local insertion opportunities to other affiliate broadcast signals.

The media comparator 206 of the illustrated example of FIG. 2 performs comparison of media conveyed in affiliate broadcasts to identify broadcast intervals having different media conveyed in at least some of the broadcast signals. The example media comparator 206 can utilize signatures, watermarks/codes, and/or any other method to compare media conveyed in the affiliate broadcast signals 104a, 104b, 104c. In some examples, the media comparator 206 can utilize watermarks embedded in audio of the affiliate broadcast signals 104a, 104b, 104c and/or in video of the affiliate broadcast signals 104a, 104b, 104c. In some examples, the media comparator 206 additionally or alternatively utilizes signatures to perform media comparison. In some such examples, the media comparator 206 can generate signatures for the affiliate broadcast signals 104a, 104b, 104c at times throughout the signals. In some examples, the media comparator 206 receives signatures corresponding to the affiliate broadcast signals 104a, 104b, 104c that have already been generated at locations where the affiliate broadcast signals 104a, 104b, 104c were initially received (e.g., locations in the regions corresponding to the affiliate broadcast signals' 104a, 104b, 104c distribution area, etc.). In some examples, the media comparator 206 can perform watermark detection and subsequently decode watermarks in the affiliate broadcast signals 104a, 104b, 104c if watermarks are found. In some examples, the media comparator 206 receives watermarks that have been detected and decoded at locations where the affiliate broadcast signals 104a, 104b, 104c were initially received (e.g., locations in the regions corresponding to the affiliate broadcast signals' 104a, 104b, 104c distribution areas, etc.). In some examples, the media comparator 206 can analyze broadcast signals to determine and select a preferred comparison technique (e.g., comparison of watermarks, comparison of signatures, etc.). In some examples, the media comparator 206 is configured with preferences as to preferred comparison techniques. In some examples, the media comparator 206 compares the affiliate broadcast signals 104a, 104b, 104c at time segments of the signals incrementally.

In response to the comparison of the example media comparator 206 determining that at least some of the affiliate broadcast signals 104a, 104b, 104c do not include similar media for a time segment, the example media comparator 206 can determine that the time segment is a non-matching interval. In some examples, the media comparator 206 can combine consecutive non-matching intervals after the time segments of the affiliate broadcast signals 104a, 104b, 104c have been analyzed. In some such examples, the media comparator 206 can combine consecutive non-matching intervals if the non-matching intervals have similar characteristics (e.g., a similar number of unique media presentations).

In some examples, the media comparator 206 can utilize multiple comparison techniques on the affiliate broadcast signals 104a, 104b, 104c to perform comparison. In some such examples, the media comparator 206 can compare signals including watermarks based on the watermarks and subsequently compare the signals based on generated signatures, or vice-versa. In some such examples, the media comparator 206 is configured with an agreeance threshold associated with the two or more comparison methods identifying the same non-matching interval before the example media comparator 206 determines the non-matching interval to be present.

The media comparator configurator 208 of the illustrated example of FIG. 3 configures the example media comparator 206 to perform comparison of affiliate broadcast signals. In some examples, the media configurator 208 analyzes the affiliate broadcast signals 104a, 104b, 104c to determine if the signals include watermarks/codes. In response to the example media comparator configurator 208 determining that the example affiliate broadcast signals 104a, 104b, 104c include watermarks/codes, the example media comparator configurator 208 can initiate the example watermark decoder 214 to decode watermarks/codes included in the signals. In some examples, the media comparator configurator 208 is configured with preferences associated with comparison techniques. For example, if the example media comparator configurator 208 determines that watermarks/codes are present, the example media comparator configurator 208 can be configured to determine that the watermarks should be used alone, to perform comparison of the example affiliate broadcast signals 104a, 104b, 104c, or that the watermarks should be used in combination with a secondary technique (e.g., signature comparison, etc.) to compare the signals. In some examples, the media comparator configurator 208 can determine that only some time segments of the affiliate broadcast signals 104a, 104b, 104c include watermarks, or other codes. In some such examples, the media comparator configurator 208 can initiate comparison using the watermarks, when available, along with signatures and/or one or more other secondary comparison techniques for other time segments. In some examples, the media comparator configurator 208 can perform analysis to determine that any comparison technique is suitable or preferred for comparison of the signals.

The signature generator 210 of the illustrated example of FIG. 2 generates signatures from broadcast signals at times throughout the signals. In some examples, the signature generator 210 generates signatures from the affiliate broadcast signals 104a, 104b, 104c upon the signals being received at the example media comparator 206. In some examples, the signature generator 210 generates signatures from the affiliate broadcast signals 104a, 104b, 104c in response to a signal from the example media comparator configurator 208 to perform media comparison using signatures. In some examples, the example signature generator 210 generates signatures utilizing the same methodology across the affiliate broadcast signals 104a, 104b, 104c to enable comparison of the signals. In some examples, the signature generator 210 may be located where the affiliate broadcast signals 104a, 104b, 104c are initially received, and may generate signatures for the signals, which are then transmitted to the insertion opportunity analyzer 108 for use in comparing media conveyed in the affiliate broadcast signals 104a, 104b, 104c.

Figure 5:
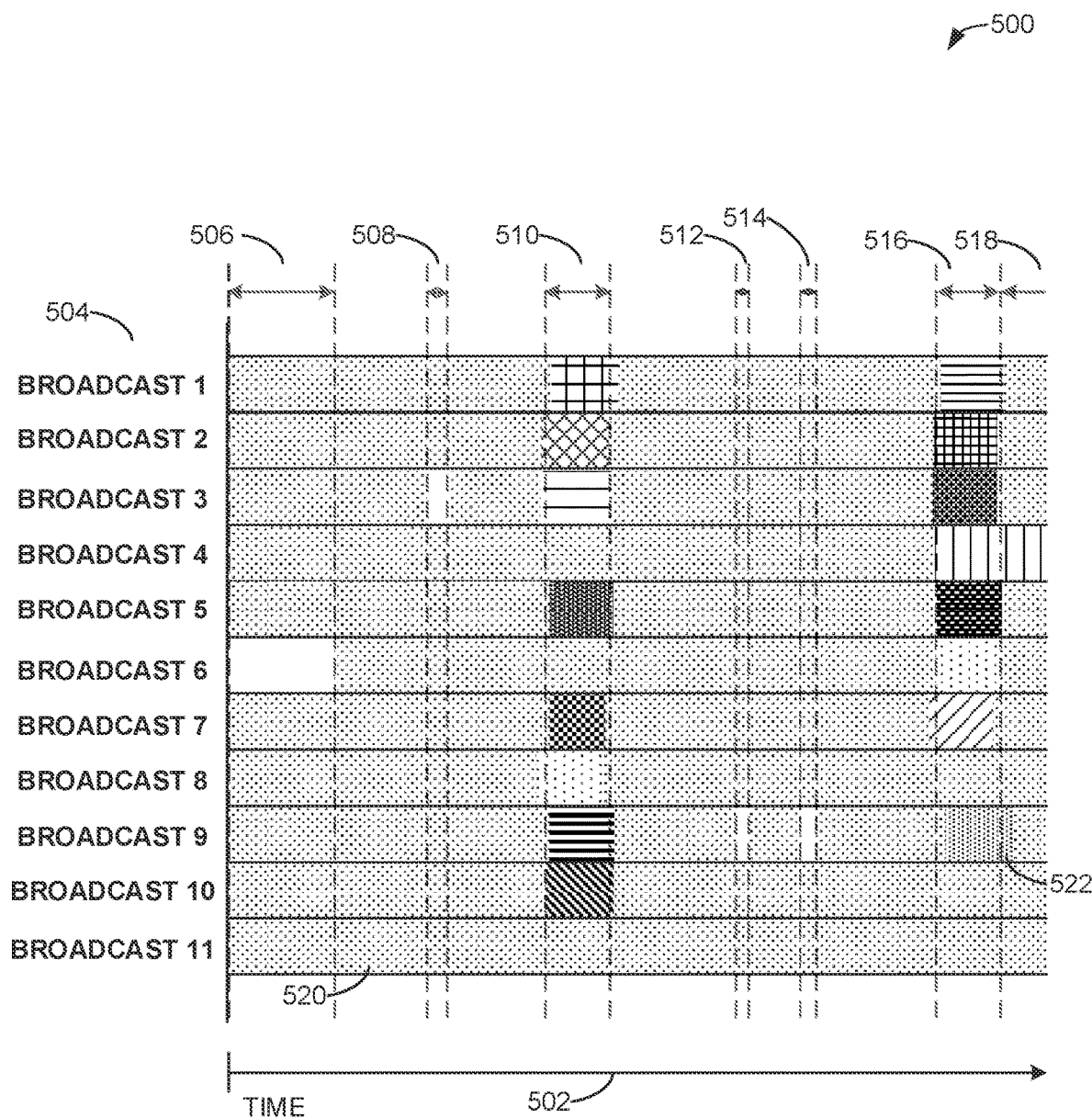
FIG. 5 illustrates an example comparison of a set of affiliate broadcasts for identification of local commercial insertion opportunities in accordance with teachings of this disclosure.

The signature comparator 212 of the illustrated example of FIG. 2 compares media included in affiliate broadcast signals based on signatures. In some examples, the signature comparator 212 utilizes the signatures generated by the example signature generator 210 to compare the example affiliate broadcast signals 104a, 104b, 104c. The example signature comparator 212 can compare signatures at similar time segments to determine if the broadcast signals include similar media during the time segments. In some examples, the signature comparator 212 is configured with a threshold associated with an allowable amount of difference between signatures for the media to still be considered similar. In some examples, if the signature comparator 212 determines one or more of the signals of the affiliate broadcast signals 104a, 104b, 104c includes different media than any other signal of the affiliate broadcast signals 104a, 104b, 104c, at a time segment, the example signature comparator 212 can determine that the time segment is a non-matching interval. In some examples, the signature comparator 212 compares a first signature pertaining to a first signal of the affiliate broadcast signals 104a, 104b, 104c with the other signals included in the affiliate broadcast signals 104a, 104b, 104c. In response to the first signal matching the other signals of the affiliate broadcast signals 104a, 104b, 104c, the example signature comparator 212 can determine the time segment includes similar media across the broadcast signals. Conversely, in response to the first signal not matching at least one of the other signals of the affiliate broadcast signals 104a, 104b, 104c, the example signature comparator 212 can determine the time segment to be a non-matching interval. Examples of identified non-matching intervals are illustrated in the schematic of FIG. 5.

The watermark decoder 214 of the illustrated example of FIG. 2 decodes watermarks/codes included in affiliate broadcast signals. In some examples, in response to the media comparator configurator 208 determining that the affiliate broadcast signals 104a, 104b, 104c include watermarks/codes, the watermark decoder 214 can decode the watermarks/codes. The example watermark decoder 214 can determine, for example, characteristics of the media that is presented based on decoding the watermarks/codes included in the signals. For example, the watermarks/codes can include a timestamp, a station identifier, a program identifier, etc. In some examples, the watermark decoder 214 transmits the decoded watermarks/codes to the watermark comparator 216 for comparison of watermarks/codes between the signals. In some examples, the watermark decoder 214 may located where the affiliate broadcast signals 104a, 104b, 104c are initially received, and may detect and decode watermarks for the signals which are then transmitted to the insertion opportunity analyzer 108 for use in comparing media conveyed in the affiliate broadcast signals 104a, 104b, 104c.

The watermark comparator 216 of the illustrated example of FIG. 2 compares media included in affiliate broadcast signals based on watermarks/codes. In some examples, the watermark comparator 216 compares the watermarks/codes generated by the watermark decoder 214. The example watermark comparator 216 can compare watermarks/codes at similar time segments to determine if the broadcast signals include similar media during the time segments. In some examples, the watermark comparator 216 is configured with a threshold associated with an allowable amount of difference between watermarks/codes for the media to still be considered similar between the broadcast signals. For example, the threshold can be associated with an allowable difference in timestamps between watermarks/codes to account for broadcasting time offsets. In some examples, the watermark comparator 216 accounts for other differences (e.g., a station identifier, an offset code, etc.) between watermarks/codes that are acceptable (e.g., do not lead to indication of a non-matching interval, etc.). In some examples, in response to the watermark comparator 216 determining that one or more of the signals of the affiliate broadcast signals 104a, 104b, 104c include different media than any other signal of the affiliate broadcast signals 104a, 104b, 104c, at a specific time segment, the watermark comparator 216 can determine that the time segment is a non-matching interval. Examples of identified non-matching intervals are illustrated in the schematic of FIG. 5.

The insertion opportunity identifier 218 of the illustrated example of FIG. 2 identifies local commercial insertion opportunities based on processing of non-matching intervals determined by the example media comparator 206. The example insertion opportunity identifier 218 also receives data from the example insertion opportunity indicator extractor 204 including data from insertion opportunity indicators (e.g., SCTE-35 codes, cue tones, etc.). In some examples, the insertion opportunity identifier 218 can combine data from the example insertion opportunity indicator extractor 204 with data from the example media comparator 206 to identify local advertisement (e.g., commercial) insertion opportunities.

The example insertion opportunity identifier 218 can, for each non-matching interval identified by the example media comparator 206, determine if the non-matching interval has at least an individuality characteristic and/or a duration characteristic. The individuality characteristic is associated with a number of instances of media conveyed by the broadcast signals during the non-matching interval. The duration characteristic is associated with the duration of the non-matching interval.

For example, the individuality characteristic can be associated with a threshold number of media signals that must be different, a percent of media signals that must be different, or any quantification of an amount of difference between the affiliate broadcast signals 104a, 104b, 104c during the non-matching time segment. In some examples, the individuality characteristic must satisfy an individuality threshold for the non-matching interval to be a local commercial insertion opportunity. For example, the individuality characteristic can avoid having a single different media presentation conveyed in an affiliate broadcast signal, compared to a multitude of affiliate broadcast signals, lead to an identification of a local commercial insertion opportunity, when a programming change, glitch, or other event may have occurred in the one different affiliate broadcast signal. The broadcast comparison schematic of FIG. 5 illustrates an example first non-matching interval 506, an example second non-matching interval 508, an example fourth non-matching interval 512, an example fifth non-matching interval 514, and an example seventh non-matching interval 518 where at least an individuality threshold may result in the non-matching threshold not being identified as a local commercial insertion opportunity.

In some examples, the individuality characteristic can be quantified by counting a number of unique media representations in the affiliate broadcast signals 104a, 104b, 104c in the non-matching interval. For example, if one hundred affiliate broadcasts are analyzed, and forty are displaying a national advertisement, thirty are displaying an identical local advertisement (e.g., from a company advertising in many localities, etc.) and thirty are displaying unique local advertisements, thirty two unique media presentations may be counted (e.g., one national advertisement, one widespread local advertisement, and thirty other local advertisements). In some examples where the national broadcast is identified, the media presentations may instead be counted by determining the number of media presentations that do not match the national broadcast. In the case of the previously described hundred affiliate broadcasts, this would result in a count of fifty one different media presentations (e.g., one national advertisement, fifty local advertisements). In some examples, the individuality threshold can be a threshold (e.g., a minimum) number of unique media representations conveyed by the affiliate broadcast signals 104a, 104b, 104c during the non-matching interval in order for the non-matching interval to be determined to be a local insertion opportunity. In some examples, the individuality characteristic can be quantified as a percentage of the affiliate broadcast signals 104a, 104b, 104c that convey different media (e.g., four different media representations out of ten affiliate broadcast signals results in forty percent different media calculation, etc.). In some examples, the individuality characteristic can be quantified by the number, or a percentage, of the affiliate broadcast signals 104a, 104b, 104c that include the most commonly identified media (e.g., the media most likely representing a national broadcast, etc.) for the non-matching interval. In such an example, a low value (e.g., number, percentage, etc.) of the affiliate broadcast signals 104a, 104b, 104c including the most commonly identified media for the non-matching interval can be indicative of a local commercial insertion opportunity.

The duration characteristic and/or threshold is implemented to ensure the duration of the non-matching interval is not unusual for a local commercial insertion opportunity. In some examples, the duration characteristic is associated with a threshold minimum duration of the non-matching interval and/or a threshold maximum duration of the non-matching interval. For example, the duration characteristic and/or threshold(s) can be configured to avoid having a short-duration glitch (e.g., a few seconds, less than a second, etc.) and/or a long duration programming change (e.g., five minutes, a half hour, etc.) result in an indication of a local commercial insertion opportunity. In some examples, the insertion opportunity identifier 218 can determine if the non-matching interval is within a specified duration value of known commercial insertion opportunity durations. For example, a common local commercial insertion opportunity interval for some broadcasters in a two minute commercial pod is a thirty-second local commercial insertion opportunity duration. In some examples, the insertion opportunity identifier 218 determines whether the duration of the non-matching interval is within a threshold of a configured, predetermined, etc. or otherwise known local commercial insertion opportunity duration, and/or is within the threshold of a multiple of the local commercial insertion opportunity duration (e.g., representative of multiple insertion opportunities, etc.). In some examples, the duration characteristic and/or threshold is associated with an amount of similarity in duration of different media presentations during the non-matching interval. For example, if there are 8 different media presentations, and each lasts approximately 30 seconds (e.g., within two seconds, etc.), it is likely that these media presentations represent local insertions.

The example media comparator 206 can utilize any other characteristics and/or thresholds to determine if a non-matching interval has characteristics associated with a local commercial insertion opportunity. The example media comparator 206 can analyze the non-matching intervals determined by the example media comparator 206 to identify the one or more non-matching interval(s) corresponding with local insertion opportunity/opportunities.

The insertion opportunity report generator 220 of the illustrated example of FIG. 2 receives data including identified local insertion opportunities and generates local insertion opportunity data and reports. In some examples, the insertion opportunity report generator 220 aggregates data from numerous affiliate broadcast signals, such as the example affiliate broadcast signals 104a, 104b, 104c and generates local insertion opportunity data for the numerous broadcast signals. In some examples, such aggregation includes combining data from the insertion opportunity indicator extractor 204 with data from the media comparator 206 and/or data from the insertion opportunity identifier 218. In some examples, the insertion opportunity report generator 220 can combine local insertion opportunity data with media identification data (e.g., specific media information as determined by another apparatus at, or in communication with, the example MMS 106 of FIG. 1) to flag appropriate differences in identified media as local insertion opportunities.

The data store 222 of the illustrated example of FIG. 2 stores data associated with local insertion opportunities. In some examples, the data store 222 stores reports generated by the example insertion opportunity report generator 220. In some examples, the data store 222 stores intermediate data from the insertion opportunity indicator extractor 204, the media comparator 206, and/or the insertion opportunity identifier 218. The data store 222 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The data store 222 may additionally or alternatively be implemented by one or more double data rate (DDR) memories, such as DDR, DDR2, DDR3, mobile DDR (mDDR), etc. The data store 222 may additionally or alternatively be implemented by one or more mass storage devices such as hard disk drive(s), compact disk drive(s) digital versatile disk drive(s), etc. While in the illustrated example the data store 222 is illustrated as a single database, the data store 222 may be implemented by any number and/or type(s) of databases. Furthermore, the data stored in the data store 222 may be in any data format such as, for example, binary data, comma delimited data, tab delimited data, structured query language (SQL) structures, etc.

In operation, the example broadcast receiver 202 receives the example affiliate broadcast signals 104a, 104b, 104c. The example insertion opportunity extractor 204 identifies insertion opportunity indicators included in any received broadcast signals and extracts data associated with the indicators. The example media comparator 206 performs media comparison between the example affiliate broadcast signals 104a, 104b, 104c by utilizing the example media comparator configurator 208 to determine a media comparison technique, and subsequently performing media comparison using the technique. The example signature generator 210 generates signatures for the example affiliate broadcast signals 104a, 104b, 104c at times throughout the broadcast signals to enable the example signature comparator 212 to perform comparison of media included in the example affiliate broadcast signals 104a, 104b, 104c. The example watermark decoder 214 decodes watermarks in the affiliate broadcast signals 104a, 104b, 104c, if present, and the example watermark comparator 216 subsequently utilizes the watermarks to perform media comparison. Following comparison of the media included in the example affiliate broadcast signals 104a, 104b, 104c, the example insertion opportunity identifier 218 determines if non-matching intervals, if any, identified during the comparison process correspond to local commercial insertion opportunities. The example insertion opportunity report generator 220 then generates local insertion opportunity data which can be stored in the example data store 222.

While an example manner of implementing the example insertion opportunity analyzer 108 of FIG. 1 is illustrated in FIG. 2, one or more of the elements, processes and/or devices illustrated in FIG. 2 may be combined, divided, re-arranged, omitted, eliminated and/or implemented in any other way. Further, the example broadcast receiver 202, the example insertion opportunity indicator extractor 204, the example media comparator 206, the example media comparator configurator 208, the example signature generator 210, the example signature comparator 212, the example watermark decoder 214, the example watermark comparator 216, the example insertion opportunity identifier 218, the example insertion opportunity report generator 220, the example data store 222, and/or, more generally, the example insertion opportunity analyzer 108 of FIG. 2 may be implemented by hardware, software, firmware and/or any combination of hardware, software and/or firmware. Thus, for example, any of the example broadcast receiver 202, the example insertion opportunity indicator extractor 204, the example media comparator 206, the example media comparator configurator 208, the example signature generator 210, the example signature comparator 212, the example watermark decoder 214, the example watermark comparator 216, the example insertion opportunity identifier 218, the example insertion opportunity report generator 220, the example data store 222, and/or, more generally, the example insertion opportunity analyzer 108 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example broadcast receiver 202, the example insertion opportunity indicator extractor 204, the example media comparator 206, the example media comparator configurator 208, the example signature generator 210, the example signature comparator 212, the example watermark decoder 214, the example watermark comparator 216, the example insertion opportunity identifier 218, the example insertion opportunity report generator 220, the example data store 222, and/or, more generally, the example insertion opportunity analyzer 108 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example insertion opportunity analyzer 108 of FIG. 1 may include one or more elements, processes and/or devices in addition to, or instead of, those illustrated in FIG. 2, and/or may include more than one of any or all of the illustrated elements, processes and devices.

Figure 3A:
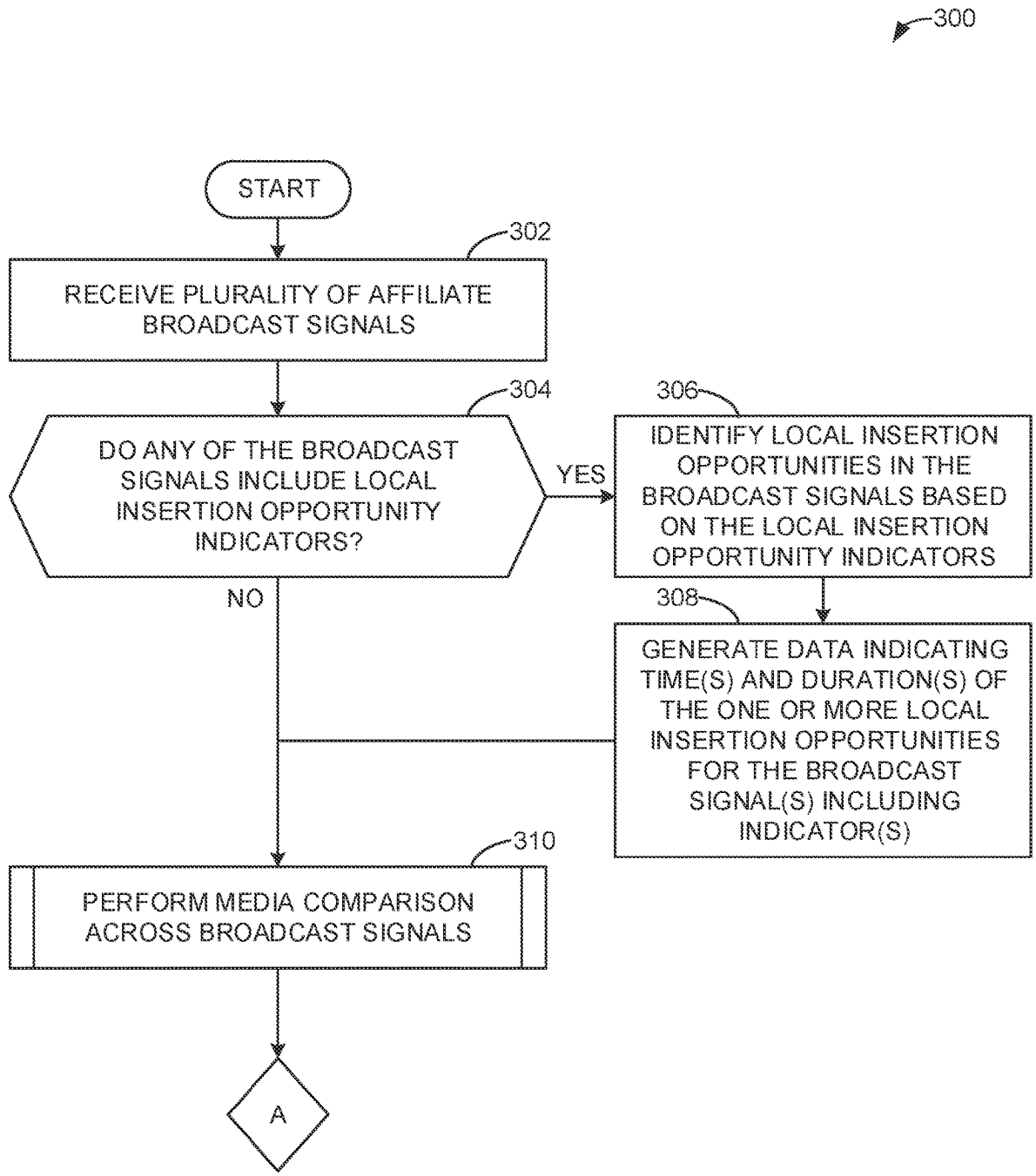
FIGS. 3A-B collectively depict a flowchart representative of example machine readable instructions that may be executed to implement the example insertion opportunity analyzer to perform identification of local commercial insertion opportunities.
Figure 3B:
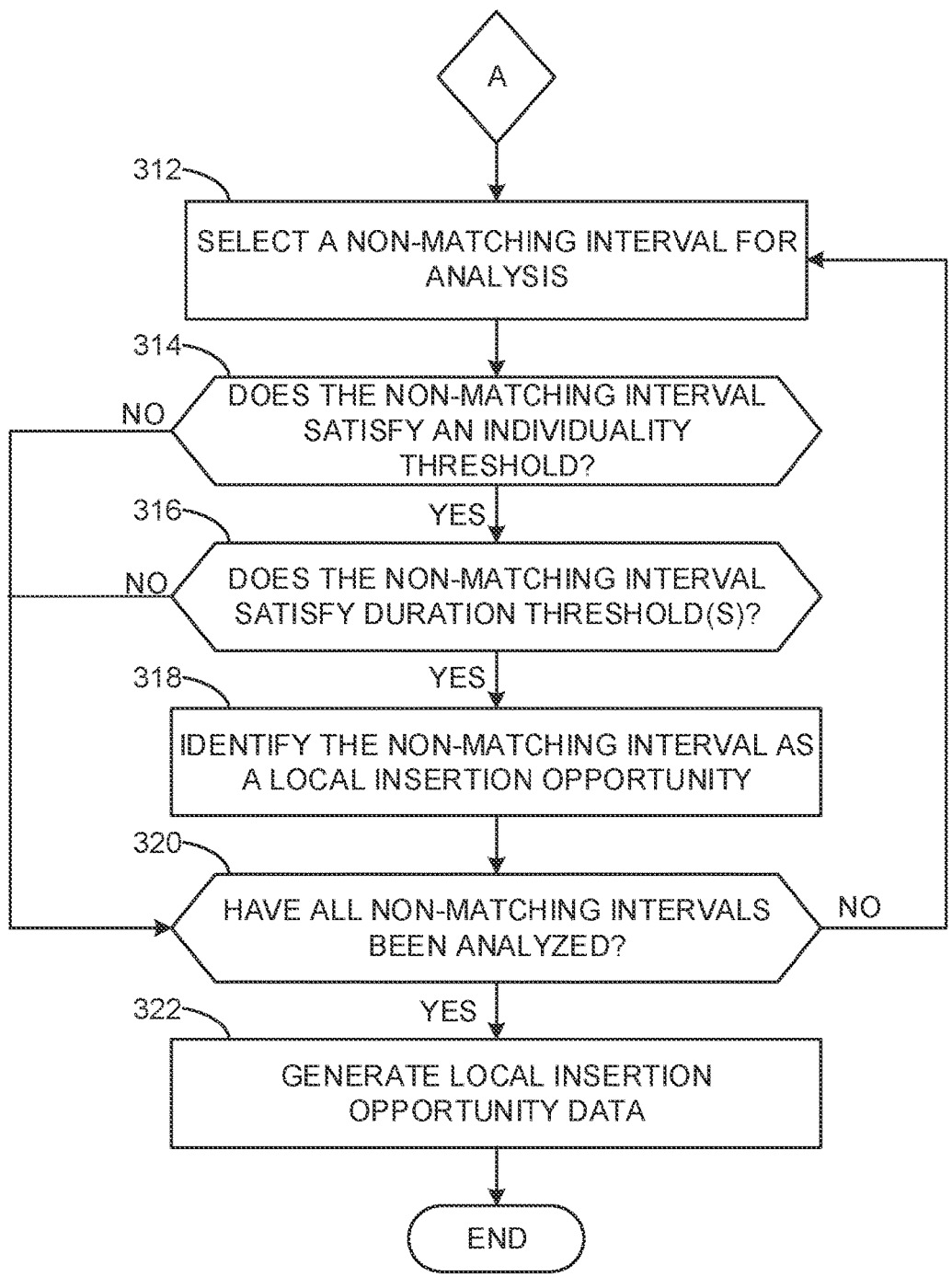
Figure 4:
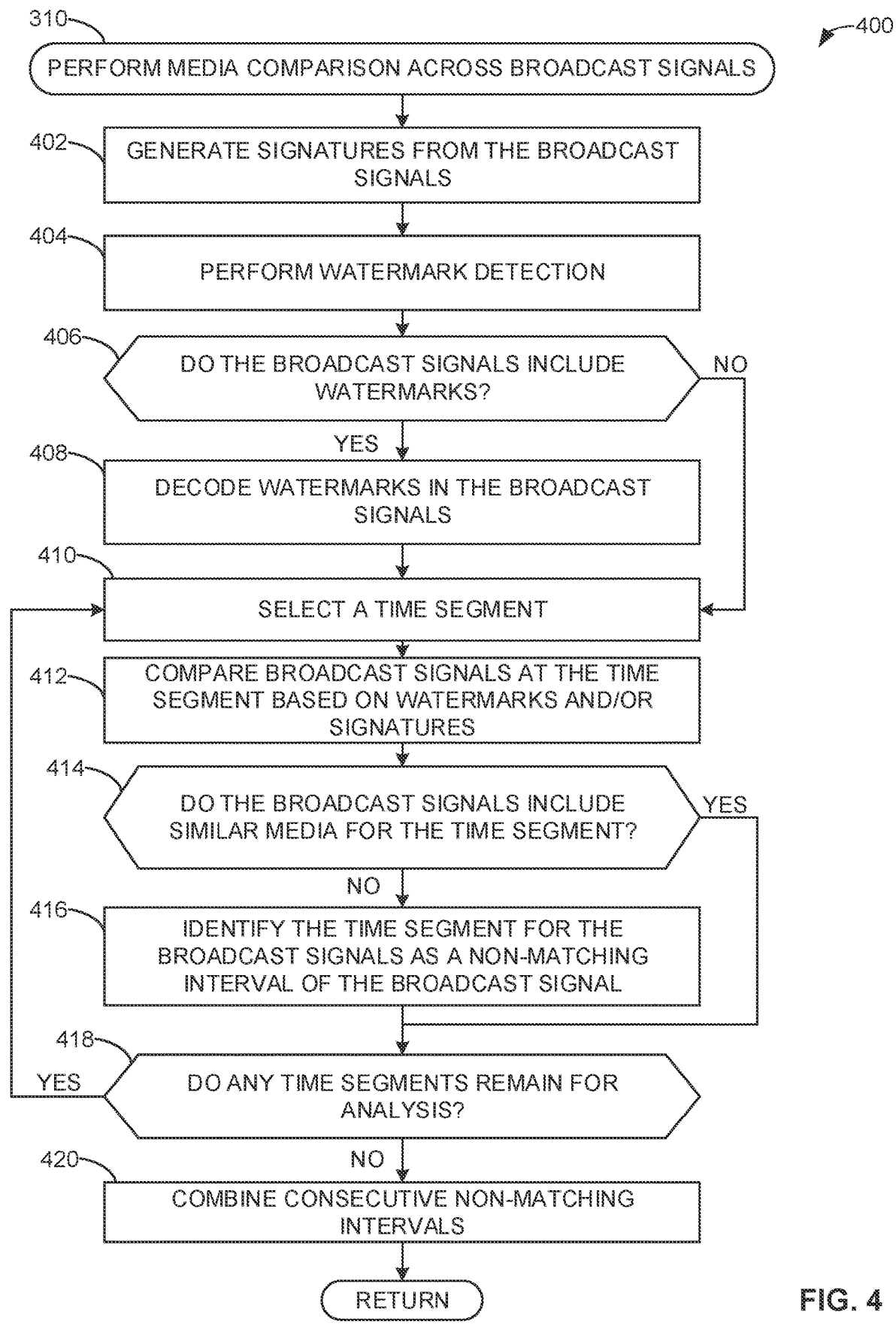
FIG. 4 is a flowchart representative of example machine readable instructions that may be executed to implement the example insertion opportunity analyzer to perform media comparison across broadcast signals.

Flowchart representative of example machine readable instructions for implementing the example insertion opportunity analyzer 108 of FIG. 2 are shown in FIGS. 3A-B, and 4. In these examples, the machine readable instructions comprise one or more programs for execution by a processor such as a processor 612 shown in the example processor platform 600 discussed below in connection with FIG. 6. The one or more programs may be embodied in software stored on a non-transitory computer readable storage medium such as a CD-ROM, a floppy disk, a hard drive, a DVD, a Blu-ray disk, or a memory associated with the processor 612, but the entire program(s) and/or parts thereof could alternatively be executed by a device other than the processor 612 and/or embodied in firmware or dedicated hardware. Further, although the example program(s) is described with reference to the flowchart illustrated in FIGS. 3A-B, and 4, many other methods of implementing the example insertion opportunity analyzer 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 3A-B, and 4 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Example machine readable instructions 300 for implementing the example insertion opportunity analyzer 108 and that may be executed to perform identification of local commercial insertion opportunities are illustrated in FIG. 3A. With reference to the preceding figures and associated descriptions, the example machine readable instructions 300 of FIG. 3A begin with the example insertion opportunity analyzer 108 receiving a plurality of affiliate broadcast signals (Block 302). In some examples, the broadcast receiver 202 receives the affiliate broadcast signals 104*a*, 104*b*, 104*c*. In some examples, the broadcast receiver 202 aggregates affiliate broadcast signals from a plurality of broadcast receivers (e.g., located in different regions, localities, etc.).

At block 304, the example insertion opportunity analyzer 108 determines whether any of the broadcast signals include local insertion opportunity indicators. In some examples, the insertion opportunity indicator extractor 204 identifies whether any of the broadcast signals include local insertion opportunity indicators, such as SCTE-35 codes, cue tones, etc. In response to the broadcast signals including local insertion opportunity indicators, processing transfers to block 306. Conversely, in response to the broadcast signals not including local insertion opportunity indicators, processing transfers to block 310.

At block 306, the example insertion opportunity analyzer 108 identifies local insertion opportunities in the broadcast signals based on the local insertion opportunity indicators. In some examples, the insertion opportunity indicator extractor 204 identifies local insertion opportunities in the broadcast signals based on the indicators. For example, an indicator may indicate a start time, a start time and a duration, and/or a start time and a stop time of a local insertion opportunity.

At block 308, the example insertion opportunity analyzer 108 generates data indicating time(s) and duration(s) of the one or more local insertion opportunities for the broadcast signal(s) including indicator(s). In some examples, the example insertion opportunity indicator extractor 204, the example insertion opportunity identifier 218, and/or the example insertion opportunity report generator 220 generate data including time(s) and duration(s) of the one or more local insertion opportunities. In some examples, the data is in a format similar to the format of the data generated by the media comparator 208, for easier synthesis of media comparison data and insertion opportunity indicator data.

At block 310, the example insertion opportunity analyzer 108 performs media comparison across the broadcast signals. In some examples, the media comparator 206 performs media comparison across the broadcast signals. Further detail regarding the implementation of block 310 is provided below in connection with FIG. 4.

The example machine readable instructions 300 to implement the example insertion opportunity analyzer 108 for identification of local commercial insertion opportunities continue in FIG. 3B. With reference to preceding figures and associated descriptions, the example machine readable instructions 300 continue with the example insertion opportunity analyzer 108 selecting a non-matching interval for analysis (Block 312). In some examples, the insertion opportunity identifier 218 selects a non-matching interval for analysis. In some examples, the insertion opportunity identifier 218 processes non-matching intervals as they are identified by the media comparator 206. In some examples, the insertion opportunity identifier 218 selects non-matching intervals for analysis in chronological order.

At block 314, the example insertion opportunity analyzer 108 determines if the non-matching interval satisfies an individuality threshold. In some examples, the example insertion opportunity identifier 218 determines if the non-matching interval satisfies the individuality threshold and/or has an individuality characteristic. For example, the example insertion opportunity identifier 218 may quantify a number of signals of the plurality of broadcast signals that convey different media during the non-matching interval. In some examples, the insertion opportunity identifier 218 may determine a number of unique media presentations during the non-matching interval between the affiliate broadcast signals. In some examples, the insertion opportunity identifier 218 determines whether the number of unique media presentations in the non-matching interval satisfies a threshold (e.g., meets or exceeds a number of differences, a percentage of unique media presentations out of the number of affiliate broadcast signals, etc.). In response to the non-matching interval satisfying the individuality threshold, processing transfers to block 316. Conversely, in response to the non-matching interval not satisfying the individuality threshold, processing transfers to block 320.

At block 316, the example insertion opportunity analyzer 108 determines whether the non-matching interval satisfies one or more duration thresholds. In some examples, the insertion opportunity identifier 218 determines if the non-matching interval satisfies a duration threshold. In some examples, the insertion opportunity identifier 218 compares the duration of the non-matching interval with a minimum duration threshold and/or a maximum duration threshold for a local commercial insertion opportunity. In some examples, the insertion opportunity identifier 218 compares the duration of the non-matching interval with one or more known local commercial insertion opportunity durations (e.g., thirty seconds, two minutes, etc.). In some examples, the insertion opportunity identifier 218 compares the duration of media presentations conveyed within the non-matching interval to determine if they are substantially similar (e.g., which may be indicative of a local commercial insertion opportunity). In response to the non-matching interval satisfying the duration threshold, processing transfers to block 318. Conversely, in response to the non-matching interval not satisfying the duration threshold, processing transfers to block 320.

At block 318, the example insertion opportunity analyzer 108 identifies the non-matching interval as a local insertion opportunity. In some examples, the insertion opportunity identifier 218 identifies the non-matching interval as a local insertion opportunity by storing time values (e.g., a start time, stop time, etc.), a duration, and/or any other data associated with the insertion opportunity to be included in the local opportunity insertion data output by the insertion opportunity report generator 220. Examples of non-matching intervals that may be identified as local insertion opportunities are illustrated and described in connection with the example schematic of FIG. 5.

At block 320, the example insertion opportunity analyzer 108 determines if the non-matching intervals have been analyzed. In some examples, the example insertion opportunity identifier 218 determines if all of the non-matching intervals, as previously identified by the media comparator 206, have been analyzed. In response to all of the non-matching intervals having been analyzed, processing transfers to block 322. Conversely, in response to all of the non-matching intervals not having been analyzed, processing transfers to block 312.

At block 322, the example insertion opportunity analyzer 108 generates local insertion opportunity data. In some examples, the insertion opportunity report generator 220 generates local insertion opportunity data based on the insertion opportunities identified by the example insertion opportunity identifier 218. In some examples, the insertion opportunity report generator 220 aggregates local insertion opportunity data and generates reports upon requests for the local insertion opportunity data. In some examples, the insertion opportunity report generator 220 generates reports automatically at specified intervals, and/or after a certain duration of the broadcast signals has been analyzed. In some examples, the insertion opportunity report generator 220 transmits the local insertion opportunity data as it is received by the example insertion opportunity identifier 218. In some examples, the insertion opportunity report generator 220 stores the local insertion opportunity data to the data store 222.

Example machine readable instructions 400 for implementing the example insertion opportunity analyzer 108 and that may be executed to perform media comparison across broadcast signals are illustrated in FIG. 4. With reference to the preceding figures and associated descriptions, the example machine readable instructions 400 of FIG. 4 begin with the example insertion opportunity analyzer 108 generating signatures from the broadcast signals (Block 402). In some examples, the signature generator 210 generates signatures from the broadcast signals. The example signature generator 210 can generate signatures using any known technique. The example signature generator 210 generates signatures using the same technique across affiliate broadcast signals to enable comparison of the signatures. In some examples, the signature generator 210 receives signals from the media comparator configurator 208 indicative of which of the affiliate broadcast signals should be utilized for signature generation. In some examples, the signature generator 210 generates signatures for all affiliate broadcast signals. In some examples, the signature generator 210 generate signatures for affiliate broadcast signals lacking watermarks/codes.

At block 404, the example insertion opportunity analyzer 108 performs watermark detection. In some examples, the media comparator configurator 208 and/or the example watermark decoder 214 perform watermark detection to determine if watermarks are present in the broadcast signals. In some examples, the media comparator configurator 208 and/or the watermark decoder 214 scan through each of the broadcast signals to determine if the broadcast signals include watermarks.

At block 406, the example insertion opportunity analyzer 108 determines whether the broadcast signals include watermarks. In some examples, the media comparator configurator 208 and/or the watermark decoder 214 determine whether any of the broadcast signals include watermarks. In response to any of the broadcast signals including watermarks, processing transfers to block 408. Conversely, in response to none of the broadcast signals including watermarks, processing transfers to block 410.

At block 408, the example insertion opportunity analyzer 108 decodes watermarks in the broadcast signals. In some examples, the watermark decoder 214 decodes watermarks in the broadcast signals for all signals for which watermarks were detected. In some examples, decoding the watermarks includes extracting media identification information form the watermarks.

At block 410, the example insertion opportunity analyzer 108 selects a time segment to perform comparison of the respective media broadcast in the affiliate broadcast signals to identify local commercial insertion opportunities. In some examples, the example signature comparator 212 and/or the example watermark comparator 216 select the time segment. In some examples, the signature comparator 212 and/or the watermark comparator 216 divide the duration of the broadcast signals into time segments corresponding to a frequency of the generated signatures and/or a frequency of watermarks included in the signal. In some examples, the signature comparator 212 and/or the watermark comparator 216 select time segments in chronological order. In some examples, the signature comparator 212 and/or the watermark comparator 216 can compare the broadcast signals as they are received substantially in real-time (e.g., accounting for processing delays, transmission delays, etc.).

At block 412, the example insertion opportunity analyzer 108 compares broadcast signals for a given time segment based on watermarks/codes and/or signatures. In some examples, the signature comparator 212 and/or the watermark comparator 216 compare the broadcast signals for the given time segment based on watermarks/codes and/or signatures. In some examples wherein the broadcast signals include watermarks/codes and signatures are generated based on the broadcast signals, the signature comparator 212 and the watermark comparator 216 each perform comparison of the broadcast signals and subsequently check for agreeance between the outputs of each comparison.

At block 414, the example insertion opportunity analyzer 108 determines whether the broadcast signals include similar media for the time segment. In some examples, the signature comparator 212 and/or the watermark comparator 216 determine whether the broadcast signals include similar media for the time segment. In some examples, the signature comparator 212 and/or the watermark comparator 216 select a first signal of the broadcast signals and then compare the first signal to the remaining signals of the broadcast signals to determine if the broadcast signals include similar media. In some examples, threshold differences can be configured in association with an acceptable difference between signatures and/or watermarks/codes for the media conveyed in the broadcast signals to still be considered similar. In response to determining the broadcast signals include similar media for the time segment, processing transfers to block 418. Conversely, in response to the broadcast signals not including similar media for the time segment, processing transfers to block 416.

At block 416, the example insertion opportunity analyzer 108 identifies the time segment for the broadcast signals as a non-matching interval of the broadcast signal. In some examples, the signature comparator 212 and/or the watermark comparator 216 identify the time segment for the broadcast signals as a non-matching interval of the broadcast signal. Example non-matching intervals are illustrated and described in connection with the example schematic of FIG. 5.

At block 418, the example insertion opportunity analyzer 108 determines if any time segments remain for analysis. In some examples, the media comparator configurator 208, the signature comparator 212, and/or the watermark comparator 216 determine if any time segments remain for analysis. In some examples wherein the signals are processed as they are received, determining if any time segments remains involves checking if the broadcast signals are still being received.

At block 420, the example insertion opportunity analyzer 108 combines consecutive non-matching intervals. In some examples, the media comparator 206 combines consecutive non-matching intervals in response to the consecutive non-matching intervals additionally having similar characteristics (e.g., a similar individuality characteristic, etc.). In some examples, after any non-matching interval is identified, the media comparator 206 determines if the previous time segment was identified as a non-matching interval. In such an example, in response to the previous time segment having been identified as a non-matching interval, and the previous non-matching interval having similar characteristics, the media comparator 206 combines the consecutive non-matching intervals. In some examples, the media comparator 206 checks the identified non-matching intervals on a regular basis (e.g., at a time interval, at an interval of the overall signal duration, etc.) to identify and combine consecutive non-matching intervals. In some examples, combined, consecutive non-matching intervals may be subsequently redivided after analyzing the non-matching intervals, if the intervals are substantially different (e.g., have very different numbers of unique media presentations represented by the signals, have media presentation durations, etc.). An example of consecutive non-matching intervals that may require division, or may not be initially combined due to having substantially different characteristics, are represented by an example sixth non-matching portion 516 and an example seventh non-matching portion 518 of the schematic 500 of FIG. 5.

FIG. 5 is an example schematic 500 of comparison of a set of affiliate broadcasts for identification of local commercial insertion opportunities. The example schematic 500 includes an example time axis 502 for comparison of eleven (11) example affiliate broadcasts signals listed along an example broadcast axis 504 over time. The broadcast signals are labeled as broadcast 1 through broadcast 11. The example broadcasts listed along the example broadcast axis are affiliate broadcasts, which display similar media at some times, and different media at other times. By performing identification of local commercial insertion opportunities in accordance with the techniques described herein, local insertion opportunities associated with this set of broadcasts can be identified.

The example schematic 500 includes several identified non-matching intervals, as identified in accordance with the teachings of this disclosure (e.g., as described in the machine readable instructions 400 of FIG. 4, etc.). In performing media comparison across the broadcast signals for the time span shown in the example schematic 500, an example first non-matching interval 506, an example second non-matching interval 508, an example third non-matching interval 510, an example fourth non-matching interval 512, an example fifth non-matching interval 514, an example sixth non-matching interval 516, and an example seventh non-matching interval 518 are identified. To determine local insertion opportunities, the techniques disclosed herein (e.g., as described in the machine readable instructions 300 of FIG. 3B) determine if the non-matching intervals satisfy at least an individuality threshold and one or more duration thresholds.

The example first non-matching interval 506 includes broadcast 6 conveying different media than the remainder of the broadcasts. In determining whether the first non-matching interval 506 represents a local commercial insertion opportunity, the example first non-matching interval 506 may not satisfy an example individuality threshold, and/or may not satisfy an example duration threshold. During the first non-matching interval 506, only one out of eleven broadcast signals includes different media. Hence, it may be considered likely that this one broadcast is simply displaying different programming, as no other broadcasts include different media during this time.

The example second non-matching interval 508 includes broadcast 3 conveying different media than the remainder of the broadcasts. In some examples, the second non-matching interval 508 may not satisfy an example individuality threshold, and/or may not satisfy an example duration threshold. For example, during the second non-matching interval 508, there is only one station displaying a unique media signal relative to the other broadcasts, which may result in the example individuality threshold not being satisfied (e.g., there are too few different media presentations represented by the broadcast signals). Further, in some examples, the duration threshold may not be satisfied due to the second non-matching interval 508 having a relatively short duration (e.g., possibly indicative of a glitch in the broadcast, a brief interruption in the broadcast, etc.)

The example third non-matching interval 510 includes broadcasts 1 through 3, broadcast 5 and broadcasts 7 through 10 conveying unique media, and broadcasts 4, 6 and 11 conveying similar media. In some examples, the third non-matching interval 510 may satisfy the individuality threshold, and/or may satisfy the duration threshold. For example, the third non-matching interval 510 has ten unique media presentations conveyed during the third non-matching interval 510, which may be an indication that a local commercial insertion opportunity took place during this interval. In some examples, the third non-matching interval 510 may satisfy the duration threshold, as the duration of the third non-matching interval 510 may be within a range of acceptable durations for a local commercial insertion opportunity, and the unique media presentations additionally have similar presentation durations.

The example fourth non-matching interval 512 and the example fifth non-matching interval 514 include broadcast 9 conveying different media than the remainder of the broadcasts. The example fourth non-matching interval 512 and the example fifth non-matching interval 514 may each not satisfy the individuality threshold, and/or may each not satisfy the duration threshold. The example fourth non-matching interval 512 and the example fifth non-matching interval 514 each, similar to the second non-matching interval 508, include very brief presentations of unique media on only one of the broadcast signals, which indicates that the fourth non-matching interval 512 and the fifth non-matching interval 514 are not likely to represent local commercial insertion opportunities.

The example sixth non-matching interval 516, similar to the third non-matching interval 510, includes many stations conveying unique media. Broadcasts 1 through 7 and broadcast 9 conveyed unique media during this interval, while broadcasts 8, 10 and 11 include similar media. Similar to the third non-matching interval 510, the sixth non-matching interval 516 may satisfy an example individuality threshold due to the numerous different media presentations and/or may satisfy an example duration threshold.

The example seventh non-matching interval 518 includes broadcast 4 conveying unique media relative to the remainder of the broadcasts. In some examples, broadcast 4 may have begun conveying different programming (e.g., local news, an infomercial, a new national broadcast, etc.) beginning at the sixth non-matching interval 516. In some examples wherein non-matching intervals are required to have similar characteristics (e.g., similar individuality characteristics, etc.) to be eligible for combination, the example sixth non-matching interval 516 and the example seventh non-matching interval 518 may not be combined. In some examples, the sixth non-matching interval 516 and the seventh non-matching interval 518 may initially be combined and subsequently may be re-divided due to the disparity in differences between media conveyed between the sixth non-matching interval 516 and the seventh non-matching interval 518. In such examples, the seventh non-matching interval 518 may not satisfy the individuality threshold due to there only being two unique media presentations across the broadcast signals (one for broadcast 4, and the other for all remaining broadcasts).

The example schematic 500 additionally includes a continuous national broadcast 520, represented by broadcast 11. In some examples, a broadcast representing a known national broadcast feed (e.g., directly from the national broadcaster) can be utilized for comparison with the remainder of the broadcast signals. In examples where a national broadcast signal is available and known, another technique for processing the signals is to compare the other local affiliate broadcast signals with the known national broadcast signal, which can be helpful in determining which signals conveyed media different than the national broadcast.

The example schematic 500 includes various time offsets associated with media presentations throughout the broadcast signals. For example, the example time offset 522 indicates that broadcast 9 is slightly delayed relative to broadcast 5, for example. Such offsets may be anticipated by data received from other systems indicative of slight broadcast delays, and can be subsequently accounted for when determining non-matching intervals and identifying local commercial insertion opportunities.

Figure 6:
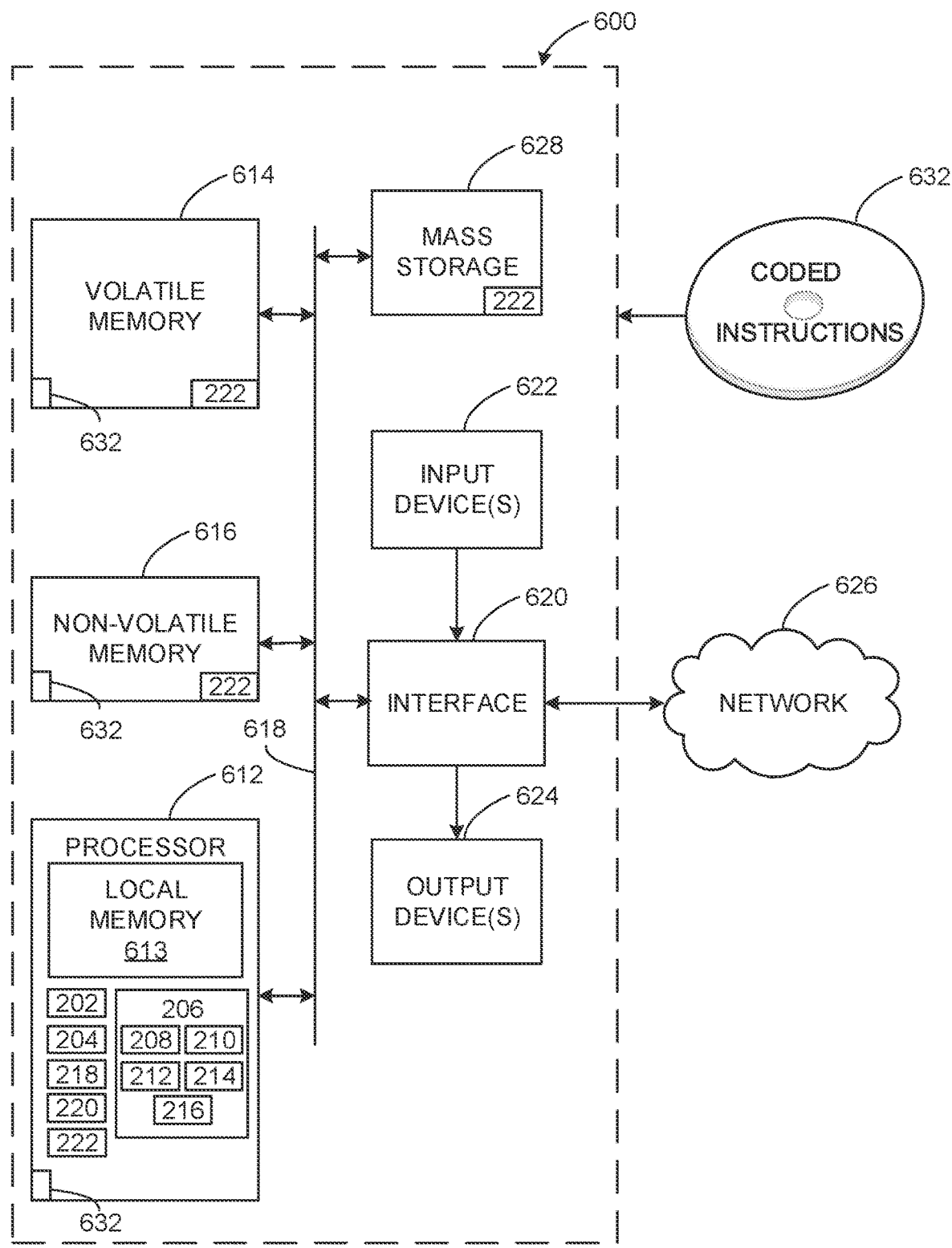
FIG. 6 is a schematic illustration of an example processor platform structured to execute the instructions of FIGS. 3A-B and 4 to implement the insertion opportunity analyzer of FIGS. 1 and 2.

FIG. 6 is a block diagram of an example processor platform 600 capable of executing the instructions of FIGS. 3A-3B and 4 to implement the example insertion opportunity analyzer 108 of FIG. 2. The processor platform 600 can be, for example, a server, a personal computer, a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The hardware processor may be a semiconductor based (e.g., silicon based) device. In this example, the processor 612 implements the example broadcast receiver 202, the example insertion opportunity indicator extractor 204, the example media comparator 206, the example media comparator configurator 208, the example signature generator 210, the example signature comparator 212, the example watermark decoder 214, the example watermark comparator 216, the example insertion opportunity identifier 218, the example insertion opportunity report generator 220, the example data store 222, and/or, more generally, the example insertion opportunity analyzer 108 of FIG. 2.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a peripheral component interconnect (PCI) express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuit 620 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and DVD drives.

The coded instructions 632 of FIGS. 3A-B and 4 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that enable an efficient, accurate identification of local commercial insertion opportunities in media signals. Unlike utilization of embedded codes (e.g., SCTE-35 codes, cue tones, etc.) to identify insertion opportunities, the example methods, apparatus, and articles of manufacture disclosed herein enable identification of local commercial insertion opportunities based on the broadcast signals alone. Consequently, local commercial insertion opportunities can be identified based on affiliate signals themselves, eliminating the need for identifying and obtaining indicators regarding local commercial insertion opportunities from national broadcasters. Further, direct analysis of the broadcast signals enables a more accurate solution than relying on indicators embedded in national broadcast signals. In some examples, the techniques disclosed herein enable local commercial insertion opportunity identification for signals that were previously not able to be analyzed to identify such opportunities, as the indicators may be unavailable to an AME (e.g., may be communicated from the national broadcaster to the affiliate via email, via a separate signal, etc.).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computing system comprising:
   a network interface;
   a processor; and
   memory storing computer-readable instructions that, when executed by the processor, cause the computing system to perform operations comprising:
   accessing, via the networks interface, first broadcast signals associated with corresponding different affiliates of a broadcaster;
   accessing, via the network interface a second broadcast signal associated with the broadcaster;
   comparing first identifiers of respective first instances of media conveyed in respective ones of the first broadcast signals to a second identifier of a second instance of media conveyed in the second broadcast signal;
   identifying a media time segment during which at least one of the respective first instances of media does not match the second instance of media; and
   classifying the media time segment as a local media insertion opportunity based on a duration of the media time segment and a count of the respective first instances of media that differ from the second instance of media during the media time segment.

2. The computing system of claim 1, the operations further comprising:
   determining, based on the first identifiers and the second identifier, the count of the respective first instances of media that differ from the second instance of media during the media time segment.

3. The computing system of claim 1, wherein the duration of the media time segment is a first duration, and
   wherein the operations further comprise determining whether the first duration corresponds to one or more second durations of one or more commercials.

4. The computing system of claim 1, to the operations further comprising:
   distinguishing the local media insertion opportunity from at least one of a programming change, a programming glitch, or a programming interruption based on the count of the respective first instances of media that differ from the second instance of media during the media time segment.

5. The computing system of claim 1, the operations further comprising:
   compensating for delays associated with transmission of the first broadcast signals when determining the count of the respective first instances of media that differ from the second instance of media during the media time segment.

6. The computing system of claim 1, wherein the broadcaster is a national broadcaster.

7. The computing system of claim 6, wherein the different affiliates are different local broadcasters associated with the national broadcaster.

8. A non-transitory computer readable medium comprising instructions that, when executed cause a processor to perform operations comprising:
   comparing first identifiers of respective first instances of media conveyed in respective ones of first broadcast signals to a second identifier of a second instance of media conveyed in a second broadcast signal, the first broadcast signals associated with corresponding different affiliates of a broadcaster, the second broadcast signal associated with the broadcaster;
   identifying a media time segment during which at least one of the respective first instances of media does not match the second instance of media; and
   classifying the media time segment as a local media insertion opportunity based on a duration of the media time segment and a count of the respective first instances of media that differ from the second instance of media during the media time segment.

9. The non-transitory computer readable medium of claim 8, the operations further comprising:
   determining, based on the first identifiers and the second identifier, the count of the respective first instances of media that differ from the second instance of media during the media time segment.

10. The non-transitory computer readable medium of claim 8, wherein the duration of the media time segment is a first duration, and
    wherein the operations further comprise determining whether the first duration corresponds to one or more second durations of one or more commercials.

11. The non-transitory computer readable medium of claim 8, the operations further comprising:
    distinguishing the local media insertion opportunity from at least one of a programming change, a programming glitch, or a programming interruption based on the count of the respective first instances of media that differ from the second instance of media during the media time segment.

12. The non-transitory computer readable medium of claim 8, the operations further comprising:
    compensating for delays associated with transmission of the first broadcast signals when determining the count of the respective first instances of media that differ from the second instance of media during the media time segment.

13. The non-transitory computer readable medium of claim 8, wherein the broadcaster is a national broadcaster.

14. The non-transitory computer readable medium of claim 13, wherein the different affiliates are different local broadcasters associated with the national broadcaster.

15. A method comprising:
    accessing first broadcast signals associated with corresponding different affiliates of a broadcaster;
    accessing a second broadcast signal associated with the broadcaster;
    comparing, by executing an instruction with a processor, first identifiers of respective first instances of media conveyed in respective ones of the first broadcast signals to a second identifier of a second instance of media conveyed in the second broadcast signal;
    identifying, by executing an instruction with the processor, a media time segment during which at least one of the respective first instances of media does not match the second instance of media; and
    classifying, by executing an instruction with the processor, the media time segment as a local media insertion opportunity based on a duration of the media time segment and a count of the respective first instances of media that differ from the second instance of media during the media time segment.

16. The method of claim 15, further comprising determining, based on the first identifiers and the second identifier, the count of the respective first instances of media that differ from the second instance of media during the media time segment.

17. The method of claim 15, wherein the duration of the media time segment is a first duration, and further comprising determining whether the first duration corresponds to one or more second durations of one or more commercials.

18. The method of claim 15, further comprising distinguishing the local media insertion opportunity from at least one of a programming change, a programming glitch, or a programming interruption based on the count of the respective first instances of media that differ from the second instance of media during the media time segment.

19. The method of claim 15, further comprising compensating for delays associated with transmission of the first broadcast signals when determining the count of the respective first instances of media that differ from the second instance of media during the media time segment.

20. The method of claim 15, wherein the broadcaster is a national broadcaster, and the different affiliates are different local broadcasters associated with the national broadcaster.

\* \* \* \* \*